US 6,616,718 B2

(12) United States Patent
Darcangelo et al.

(10) Patent No.: US 6,616,718 B2
(45) Date of Patent: Sep. 9, 2003

(54) AQUEOUS SOLUTION FOR COLLOIDAL POLISHING OF SILICATE SUBSTRATES

(75) Inventors: Charles M. Darcangelo, Corning, NY (US); Robert Sabia, Big Flats, NY (US); Harrie J. Stevens, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/962,028

(22) Filed: Sep. 24, 2001

(65) Prior Publication Data

US 2002/0028639 A1 Mar. 7, 2002

Related U.S. Application Data

(62) Division of application No. 09/364,143, filed on Jul. 30, 1999, now Pat. No. 6,322,425.

(51) Int. Cl.[7] .............................. C09G 1/02; C09G 1/04
(52) U.S. Cl. ........................... 51/308; 51/307; 51/309; 106/3
(58) Field of Search ..................... 51/308, 309, 307; 106/3; 438/692, 693; 216/89, 97; 510/397, 180, 181

(56) References Cited

U.S. PATENT DOCUMENTS

| 5,228,886 A | * | 7/1993 | Zipperian | 51/293 |
|---|---|---|---|---|
| 5,264,010 A | | 11/1993 | Brancaleoni et al. | 51/308 |
| 5,266,088 A | | 11/1993 | Sandusky et al. | 51/298 |
| 5,766,279 A | | 6/1998 | Ueda et al. | 51/308 |
| 5,769,691 A | | 6/1998 | Fruitman | 451/41 |
| 5,816,891 A | | 10/1998 | Woo | 451/41 |
| 5,816,895 A | | 10/1998 | Honda | 451/41 |
| 5,913,712 A | | 6/1999 | Molinar | 451/41 |
| 6,063,306 A | * | 5/2000 | Kaufman et al. | 216/89 |
| 6,312,487 B1 | * | 11/2001 | Tanaka | 106/3 |

FOREIGN PATENT DOCUMENTS

| EP | 0 733 270 A2 | 5/1997 |
|---|---|---|
| EP | 0 826 757 A1 | 3/1998 |
| EP | 0 786 504 A3 | 5/1998 |
| EP | 0 874 036 A1 | 10/1998 |
| JP | 64-40267 | 2/1989 |
| WO | 96/38262 | 12/1996 |
| WO | 97/08689 | 3/1997 |
| WO | 97/43087 | 11/1997 |
| WO | 97/47430 | 12/1997 |
| WO | 98/50200 | 11/1998 |

* cited by examiner

Primary Examiner—Michael Marcheschi
(74) Attorney, Agent, or Firm—Vincent T. Kung

(57) ABSTRACT

A two-part reagent method for polishing an inorganic silicate substrate is provided. The method comprises: providing a silicate substrate; providing a reagent comprising: a first part consisting essentially of an aqueous solution of at least one metal oxide abrasive selected from the group consisting of titania, zirconia, germania, and germania-doped silica; and a second part consisting essentially of an alkali aqueous solution of colloidal silica having a buffered pH value of at least about 10; polishing a surface of said substrate with the metal oxide abrasive aqueous solution to a surface roughness (Ra) ranging from about 6 Å to about 10 Å; and further polishing the surface with said alkali aqueous solution of colloidal silica to a roughness of less than or equal to about 5 Å.

12 Claims, No Drawings

AQUEOUS SOLUTION FOR COLLOIDAL POLISHING OF SILICATE SUBSTRATES

RELATED APPLICATION

The present Application is a divisional of U.S. patent application Ser. No. 09/364,143, filed Jul. 30, 1999, now U.S. Pat. No. 6,322,425 in the names of C. Darcangelo, R. Sabia, and H. Stevens, and claims priority thereto.

TECHNICAL FIELD

This invention relates to an alkali solution of colloidal silica for use according to a method of polishing inorganic silicate substrates at high pH values.

BACKGROUND ART

Application of colloidal suspensions for polishing advanced materials has become an exceedingly critical aspect of final part formation for the glass and microelectronics industries. Silica and alumina colloids are commonly utilized for polishing various microelectronic materials (copper, tungsten, silicon, etc.), and ceria colloids are frequently used for high quality glass surface processing.

Critical issues in generating high quality optical surfaces for silicate substrates, such as fused silica or silicate glasses, include the removal of surface and subsurface damage remnant from preliminary grinding processes, and the generation of relatively small topographical features with a surface roughness (Ra) typically below 5 Å. For primarily mechanically-oriented abrasives such as zirconia and alumina, the final surface finish is dictated by the size and morphology of the abrasive grains. For chemical-mechanical polishing abrasives such as cerium and iron oxides, the formation of residual damage is hindered by the fact that the abrasive grains are heat treated to be a hardness comparable to that of the glass. For this reason, cerium oxide has been the abrasive of choice for the majority of glass polishing applications since the 1940's.

The development of colloidal silica as a polishing abrasive is two fold. Colloidal silica has a spherical morphology and widely varied particle size (typically, about 20–50 nm in diameter), which minimizes scratches in softer materials. By mixing the colloidal silica in water for polishing materials such as aluminum and silicon, the surface of the metal hydrolyses and allows the abrasive nature of the colloidal silica to remove the reaction layer while minimizing interactions with the underlying surface.

For glass polishing, pH is most commonly adjusted to be acidic in order to prevent dissolution of the glass surface. This procedure has resulted in part from the fact that the different glasses will corrode and form reaction layers in widely varying fashions. By polishing glass at a relatively low pH, the glass surface does not corrode, but rather has the opportunity to chemo-mechanically interact with the cerium oxide abrasive and promote removal in a controlled manner.

SUMMARY OF THE INVENTION

An aspect of the present invention is an aqueous, alkali solution of colloidal silica for polishing inorganic silicate substrates, such as silicate-based glasses—aluminosilicates, borosilicates, titania-silicates, or corrosion resistant mixed alkali glasses—or fused silica. Preferably, the silica solutions are adjusted to a pH of 10 or above. The polished silicate surfaces have surface finishes consistently below about 2 Å Ra. Most preferably, the surface finish is about 1 Å Ra.

Although colloidal silica in neutral and acidic environments has been applied to various glasses with mixed results, the present invention processes highly polished surfaces of an inorganic silicate substrate by controlled polishing with an aqueous solution of colloidal silica having a buffered pH value of about 10 or greater. The method comprises, first polishing the glass to a surface finish below 10 Å using conventional abrasives, then applying colloidal silica in a second polishing step. This process improves surface quality by means of combined use of surface corrosion by the alkali solution and removal of the continually-forming, hydrated surface layer by the spherical colloidal silica. We also have found small particle size colloidal silica, of about 50 nm or less, to be preferred. In comparison to colloidal silica polishing of glass at lower pH, the solubility of the glass surface and the stability of the colloidal solution interfere and prevent significant improvements in surface finish. Critical to this finishing protocol is the need to remove surface and subsurface damage prior to the colloidal silica polishing step in order to prevent the alkali solution from etching the damaged areas. Furthermore, a soft polishing pad must be used during the colloidal-silica-polishing step to prevent damage commonly induced when hard pads contact silicate glass surfaces during colloidal abrasive polishing.

DETAILED DESCRIPTION OF THE INVENTION

The method used with the present invention focuses on the use of colloidal silica polishing abrasive marketed for microelectronics applications. For the microelectronics field, material removal can be accelerated by using high pH (>10) solutions where the metal can dissolve under the alkali environment.

Our method for final polishing silica substrates comprises the steps of providing a silicate substrate, first polishing a surface of the substrate with an aqueous solution of at least one metal oxide abrasive to a surface roughness (Ra) ranging from about 6 Å to about 10 Å; and further polishing the surface of the substrate with an alkali, aqueous solution of colloidal silica to a surface roughness (Ra) of about 5 Å or less. Preferably, the first polishing step polishes the surface of the substrate to a surface roughness (Ra) of about 8 Å. Preferably, the further polishing step polishes the surface of the substrate to surface roughness Ra of about 2 Å or less.

The metal oxide abrasive is alumina, titania, zirconia, germania, silica, germania-doped silica, or ceria. Preferably, the metal oxide abrasive is cerium oxide.

Generally, the aqueous solution of colloidal silica is buffered to a pH ranging from about 8 to 18. Preferably, the aqueous solution of colloidal silica is buffered to a pH value of about 10 or greater. More preferably, the solution has a pH value ranging from about 10.5 to 13.5 or 14. The process relies predominately on surface corrosion by the alkali solution and partially on a preferred removal of microscopic peaks on the silicate substrate surface by abrasive pad interactions with the surface to promote improved overall roughness qualities through reducing peak-to-valley heights on both macroscopic and microscopic scales.

Typically, the silicate substrate is made of silica, fused silicates, or glasses thereof. Preferably, the silica substrate is fused silica. Generally, the colloidal silica has an average particle size of up to about 50 nm. Typically, the particle size ranges from 10 nm to 50 nm and preferably ranges from 20 nm to 40 nm or 45 nm. Particle size and surface area dimensions are understood to be greater than zero.

In one embodiment, the colloidal silica acts as a cleaning agent and removes any residual abrasive from previous polishing steps. For example, the colloidal silica removes any remaining cerium oxide from the first polishing step. A hard polishing pad carries out the first polishing step and a soft polishing pad carries out the further polishing step. Preferably, the hard polishing pad is a blown polyurethane and the soft polishing pad is a napped polyurethane.

EXAMPLE

Samples of fused silica glass were machined via grinding and lapping processes to form a flat surface with minimal subsurface damage. A first polishing step was applied to each sample using a cerium oxide abrasive (Ferro Corporation, Product Code 482) and a hard polishing pad (Rodel Incorporated, Product Code MHC-14B), thus generating a surface finish of Ra=8 Å (Table 1). The abrasive used for the second polish was colloidal silica available commercially through Cabot Corporation (Product Code A2095). The colloidal silica had a surface area of 200 m²/g or less. The solution had been dispersed to a pH of about 10, and was used in combination with a soft polishing pad from Rodel Incorporated (Product Code 204). Final surface finishes were measured using an atomic force microscope to have a Ra less than 2 Å (Table 2).

Table 1, below, shows atomic force micrograph of fused silica surfaces polished using cerium oxide as first polishing step. Z range is the ratio of peaks to valleys on the polished surface. Rq is the root means square of the roughness. Ra is the average roughness and the critical measurement.

TABLE 1

Image Statistics

| Img. Z range | 47.947 nm |
|---|---|
| Img. Mean | −0.0002 nm |
| Img. Rms (Rq) | 1.636 nm |
| Img. Ra | 1.034 nm (10.34Å) |

Table 2 below shows atomic force micrograph of fused silica surfaces polished using colloidal silica at a pH 10–11 as a second and final polishing step. The fused silica surface had a roughness (smoothness) of 1.73 Å.

TABLE 2

Image Statistics

| Img. Z range | 5.179 nm |
|---|---|
| Img. Mean | −0.00005 nm |
| Img. Rms (Rq) | 0.173 nm (1.73Å) |
| Img. Ra | 0.135 mn |

The data shows that, for polishing silicate substrates, especially fused silica, a colloidal silica solution having a pH value of about 10 has proven very effective in generating fine surface finishes with Ra<2 Å. A surface finish this fine could not be generated from colloidal silica solutions with a lower pH of less than about at least 8—preferably closer to 9—because of the low solubility of glass at low pH values. The data shows the usefulness of a commercially available, colloidal silica polishing abrasive for the microelectronics field. The polishing protocol for polishing fused silica using colloidal silica dispersed in a solution buffered to a pH of about 10, coupled with using the dispersion in a second polishing step provides super-polished surfaces having a surface roughness that the industry could not previously achieve.

Although the present invention has been described in detail, persons skilled in the art will understand that the invention is not limited to the embodiments specifically disclosed, and that various modification and variations can be made without departing from the spirit and scope of the invention. Therefore, unless changes otherwise depart from the scope of the invention as defined by the following claims, they should be construed as included herein.

We claim:

1. A two-part reagent solution system for polishing an inorganic silicate substrate, the solution system comprising:
   a first part consisting essentially of an aqueous solution of at least one metal oxide abrasive selected from the group consisting of titania, zirconia, germania, and germania-doped silica; and
   a second part consisting essentially of an alkali aqueous solution of colloidal silica having a buffered pH value of at least about 10.

2. The reagent solution system according to claim 1, wherein said colloidal silica solution has a pH value of at least about 10.5.

3. The reagent solution system according to claim 1, wherein said colloidal silica solution has a pH value of about 10.5 to about 15.

4. The reagent solution system according to claim 1, wherein said colloidal silica solution has a pH value of about 10.5 to about 13.5.

5. The reagent solution system according to claim 1, wherein said solution of metal oxide abrasive further includes aluminum oxide, silica, or cerium oxide.

6. The reagent solution system according to claim 1, wherein said colloidal silica is spherical in shape.

7. The reagent solution system according to claim 1, wherein said colloidal silica has an average particle size ranging from about 10–50 nm.

8. The reagent solution system according to claim 7, wherein said colloidal silica has an average particle size ranging from about 20–40 nm.

9. The reagent solution system according to claim 1, wherein said colloidal silica has a surface area of less than or equal to about $200^2$/g.

10. The reagent solution system according to claim 1, wherein said metal oxide abrasive aqueous solution is used to polish a surface of said substrate to a surface roughness (Ra) ranging from about 6 Å to about 10 Å.

11. The reagent solution system according to claim 1, wherein said alkali aqueous solution of colloidal silica is used to polish further said surface to a roughness of less than or equal to about 5 Å.

12. The reagent solution system according to claim wherein said alkali aqueous solution of colloidal silica is used to polish further said surface to a surface roughness (Ra) of $\leq 2$ Å.

* * * * *

UNITED STATES PATENT AND TRADEMARK OFFICE
CERTIFICATE OF CORRECTION

PATENT NO. : 6,616,718 B2
DATED : September 9, 2003
INVENTOR(S) : Charles M. Darcangelo et al.

It is certified that error appears in the above-identified patent and that said Letters Patent is hereby corrected as shown below:

<u>Column 4,</u>
Line 48, delete "$200^2$/g" and add -- $200\ m^2/g$ --

Signed and Sealed this

Tenth Day of February, 2004

JON W. DUDAS
*Acting Director of the United States Patent and Trademark Office*